United States Patent Office 2,871,681
Patented Feb. 3, 1959

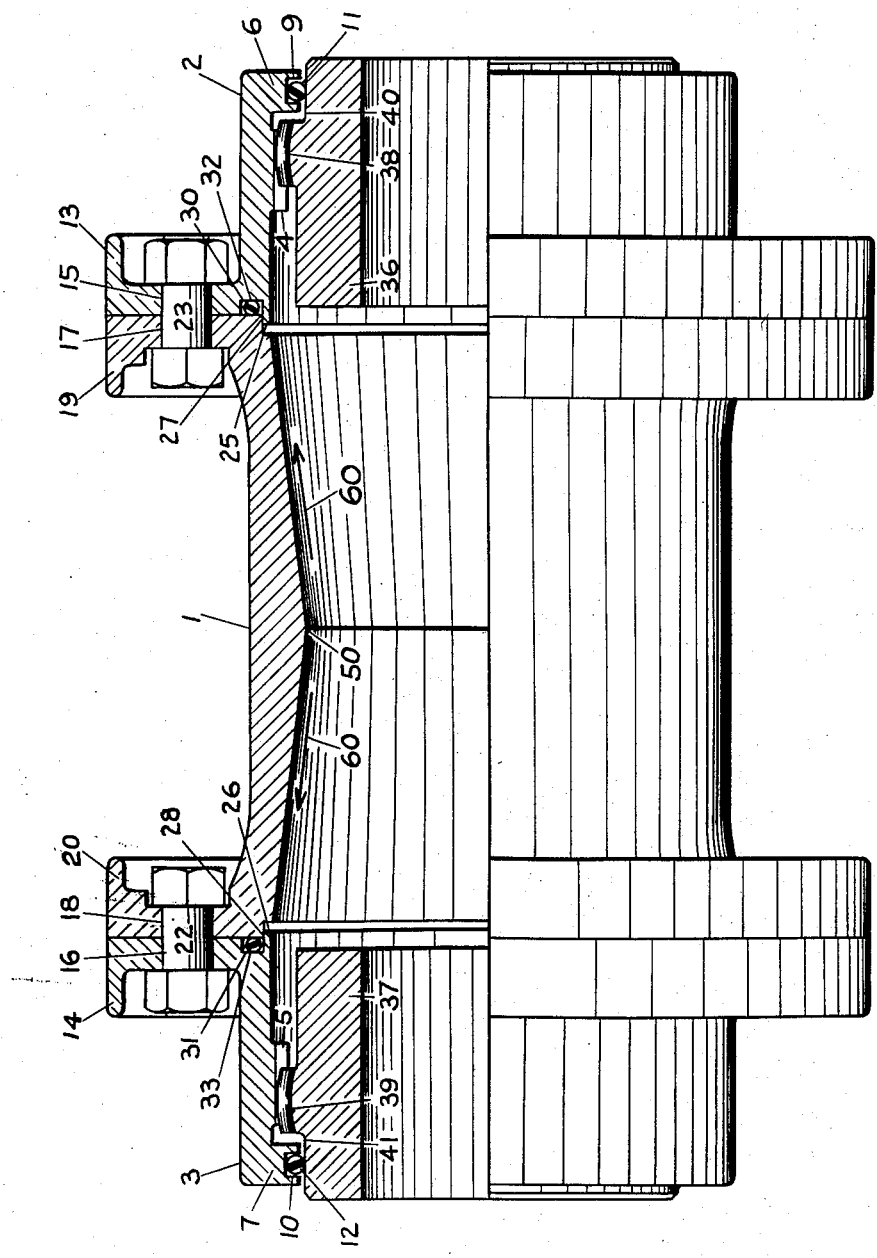

2,871,681

SHAFT COUPLING

Donald J. Beecher, Erie, Pa., assignor to American Flexible Coupling Company, Erie, Pa., a corporation of Pennsylvania Application May 27, 1955, Serial No. 511,590

2 Claims. (Cl. 64—9)

This invention relates to couplings and more particularly to gear type couplings wherein a lubricant such as grease or heavy oil is required to lubricate the teeth of the gears.

In gear type couplings made according to designs known prior to this invention, a sleeve having internal gear teeth therein engaged two spaced externally toothed gear members. The inner periphery of the internal toothed sleeve between the gear teeth was usually of a plain cylindrical surface. This allowed oil to settle at the central portion of one part thereof when the shaft was idle and, when grease was used, the grease was inclined to congeal at the central bottom point. When the shaft started to rotate, the congealed grease acted as a concentrated weight and thereby introduced an unbalance into the system, causing objectionable vibration. Further, sleeves of the said prior designs which allowed the lubricant to remain at the central portion of the sleeve developed a poor lubrication situation and a large portion of the lubricant did not engage the teeth of the gears at the points where it was most needed.

It is, accordingly, an object of this invention to overcome the above and other defects in prior designs of sleeve connections for gear couplings and, more particularly, it is an object to provide a sleeve for connecting gear couplings which is simple in construction, economical to manufacture, and simple and efficient to use.

Another object of this invention is to provide a sleeve for connecting gear type couplings which has an inner peripheral surface which increases in diameter in both directions from the center of the coupling.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The figure of drawing is a partial cross sectional view of a gear type coupling according to the invention.

Now with more specific reference to the drawing, a gear type coupling is shown having internal gear members 2 and 3 connected together by a sleeve 1. The internal gear members 2 and 3 have internal teeth 4 and 5, respectively, formed on the inner periphery thereof. Inwardly directed flanges 6 and 7 are integrally attached to the internal gear members 2 and 3 and extend inwardly toward the axis of a shaft from the internal teeth 4 and 5 thereon. The flanges 6 and 7 have inner peripheral grooves 9 and 10, respectively, which receive O-shaped sealing washers 11 and 12, respectively.

On the opposite ends from the flanges 6 and 7 of the gear members 2 and 3 are formed outwardly extending flanges 13 and 14 which have spaced holes 15 and 16 which register with spaced holes 17 and 18, respectively, in flanges 19 and 20 on the sleeve member 1. The holes 17 and 18 are suitably counterbored to receive the heads of bolts 22 and 23. The bolts 22 and 23 hold the sleeve 1 in proper relative relation to the internal gear members 2 and 3. The gear members 2 and 3 have coaxially reduced size portions which engage inner peripheral grooves 27 and 28, respectively, of the sleeve member 1, thereby holding the gear members 2 and 3 in positive alignment with the sleeve member 1. Grooves 30 and 31 are formed in the ends of the gear members 2 and 3, respectively, which receive O-shaped washers 32 and 33, respectively. The O-shaped washers 32 and 33 engage the end surface of the sleeve 1 and form a seal against the escape of lubricant or the entrance of foreign material into the coupling.

Hubs 36 and 37 having teeth 38 and 39, respectively, are joined with the gear members 2 and 3. The teeth 38 and 39 are preferably crowned in the manner described in Patent Number 2,682,760 or in like manner so that shafts attached to the hub members 36 and 37 will have capacity to operate in misalignment with each other; that is, in angular relationship with each other as opposed to their being in alignment with each other. The hub members 36 and 37 have shoulders 40 and 41 which extend outwardly beyond the gear teeth 38 and 39 and form a surface to engage the O-shaped packing washers 11 and 12, thereby providing a seal against grease and also allowing for a certain amount of relative lateral movement between the hub members 36 and 37 and the gear members 2 and 3.

The inner peripheral surface of the sleeve member 1 increases in diameter from the central minimum diameter point 50 and when the rotation of the shaft is stopped, lubricating oil tends to flow toward the gear teeth 4 and 5 when the shaft stops rotating before the oil has its capacity to flow reduced because of the decrease in temperature after the coupling stops rotating. In a coupling having a sleeve with a plain inner cylindrical surface, the lubricant will spread out in a uniform film from end to end in the bottom portion of the coupling and not be urged to flow toward the teeth. By having the diameter of the inner periphery of the sleeve 1 increased outward from the center, the lubricant is urged to run toward the gears 2 and 3 so that it will not congeal at a localized area and, therefore, cause an eccentric weight to disturb the balance of the coupling when rotation of the shaft is again started. Further, while the coupling is being rotated, centrifugal force, being greater at distances spaced from the center 50 than the center, a resultant force in the direction of the arrows 60 will be exerted on the lubricant and, therefore, tend to urge it to flow toward the gear teeth 4 and 5 where the lubricant is needed rather than have the lubricant rest at the center of the coupling where it will not be of any use to the gear teeth 4 and 5. The slope of the surface sloping outward from the center 50 may be changed to suit the requirements of particular cases which will be affected by oil pressure and other factors. The slope of the said surface can be tailored for optimum performance.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising two spaced internal gear members, each having an outwardly extending peripheral flange adjacent one end thereof, two spaced hubs, each said hub member having external crowned gear teeth thereon engaging one said internal gear and adapted to be connected to a shaft, said hub member having a cylindrical surface extending axially from said external teeth, a sleeve having an outwardly directed flange on each end thereof adapted to be attached to said outwardly extending flanges on said internal gears whereby said gears are attached together, sealing means between said flanges, and an inwardly directed peripheral flange on the outer end of each said internal gear extending inwardly at right angles therefrom, each said peripheral flange having an inner peripheral groove on the inside thereof, each groove having an O-shaped washer therein forming sealing engagement with said cylindrical surface of one of said hubs, the inner periphery of said sleeve increasing gradually from the center toward the ends whereby the internal diameter thereof at the center is substantially less than at the ends, the major diameter of said sleeve being substantially equal to the root diameter of said internal gears, and the centrifugal force exerted on lubricant in said sleeve is greater at points spaced from the center than at the center whereby lubricant is urged toward said gears.

2. The coupling recited in claim 1 wherein a counterbore is formed in each end of said sleeve and the internal gear members each have a reduced size portion concentric therewith extending outwardly from the end thereof and into said counterbore.

References Cited in the file of this patent

UNITED STATES PATENTS

| | | |
|---|---|---|
| 1,356,860 | Fast | Oct. 26, 1920 |
| 2,035,171 | Loewus | Mar. 24, 1936 |
| 2,121,507 | Morgan | June 21, 1938 |
| 2,455,870 | Maul et al. | Dec. 7, 1948 |
| 2,543,918 | Lower | Mar. 6, 1951 |